United States Patent

Takikawa et al.

[11] Patent Number: 5,094,481
[45] Date of Patent: Mar. 10, 1992

[54] CONNECTOR FOR SMALL-DIAMETER PIPING

[75] Inventors: Kazunori Takikawa; Katsushi Washizu, both of Numazu, Japan

[73] Assignee: Usui Kokusai Sangyo Kaisha Limited, Japan

[21] Appl. No.: 549,226

[22] Filed: Jul. 6, 1990

[30] Foreign Application Priority Data

Jul. 7, 1989 [JP] Japan .................. 1-175947

[51] Int. Cl.⁵ .......................................... F16L 39/00
[52] U.S. Cl. .................................. 285/319; 285/382; 285/921; 285/906
[58] Field of Search ........... 285/319, 382, 315, 94, 285/906

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,271,052 | 9/1966 | Watus ................ 265/319 X |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | De Vincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,451,069 | 5/1984 | Melone . |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,682,798 | 7/1987 | Sayer .............................. 285/319 X |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham ................. 265/319 X |
| 4,793,637 | 12/1988 | Laipply et al. . |
| 4,874,191 | 10/1989 | Green ............................... 285/382 |
| 4,895,396 | 1/1990 | Washizu . |
| 4,913,467 | 4/1990 | Washizu . |
| 4,915,420 | 4/1990 | Washizu . |

FOREIGN PATENT DOCUMENTS

| | | | |
|---|---|---|---|
| 129944 | 5/1947 | Australia ................... 285/315 |
| 1391023 | 1/1965 | France ...................... 285/319 |
| 593413 | 5/1959 | Italy . |
| 855603 | 12/1960 | United Kingdom . |

*Primary Examiner*—Dave W. Arola
*Attorney, Agent, or Firm*—Anthony J. Casella; Gerard E. Hespos

[57] ABSTRACT

A connector used in connecting a resin tube and a metallic pipe of comparatively small diameter comprises a connector body and a plurality of elastic pawl members. The connector body is formed with a large-diameter chamber. The peripheral wall of the chamber has a plurality of lock holes distributed in the circumferential direction thereof. Each elastic pawl member is assembled such that its rear end portion is passed through a corresponding one of the lock holes, bent and secured in place, and its front end portion resiliently retains and secures an expanded portion of the pipe inserted in the chamber.

14 Claims, 3 Drawing Sheets

CONNECTOR FOR SMALL-DIAMETER PIPING

BACKGROUND OF THE INVENTION

1. Field of the Invention

This invention relates to a connector which is used in connecting a resin tube and a metallic pipe of comparatively small diameter (up to 20 mm) provided in various machines such as cars as a supply path of oil, air, etc.

2. Description of the Prior Art

A conventional connector of such a type is configured as shown in FIG. 7. That is, a cylindrical connector body 21 has a coupling wall 22 provided at the front end thereof which is formed with an axial through hole 24, a stepped large-diameter chamber 23 formed in the rear half thereof, and a lock wall 23' provided at the rear end thereof. Sealing members 26 are fitted in the chamber 23, and a bushing member 27 for retaining the sealing members 26 is fitted to a stepped portion of the chamber 23. A socket member 28 having pawl walls 25 and 25' is attached such that its rear annular wall 28' is locked by the lock wall 23'. At this time, the pawl walls 25 and 25' are aligned with elongated holes 29 and 29' formed in the peripheral wall of the chamber 23 to resiliently secure an expanded portion of a pipe Po inserted in the chamber 23.

According to the foregoing prior art, the rear annular wall 28' of the socket member 28 is locked by the lock wall 23' of the connector body 21, and the pawl walls 25 and 25' of the socket member 28 are aligned with the elongated holes 29 and 29'. To assemble the socket member 28, root portions 28" of the pawl walls 25 and 25' must be compressed such that the rear annular wall 28' can pass inside the lock wall 23'. Therefore, the connector as a whole must be made large in diameter and in length, this causing interference with other parts when used in a narrow space. Further, the pawl walls 25 and 25' of the socket member 28 must be made long in proportion to an increase in diameter, this weakening the force of resiliently securing the expanded portion of the pipe Po, causing "permanent set in fatigue", and making connection unstable in long-term use.

SUMMARY OF THE INVENTION

It is an object of the present invention to provide a connector for small-diameter piping which is small in diameter and in length, causes no interference with other parts even used in a narrow space, provides a large force of resiliently securing a pipe, has no fear of "permanent set in fatigue", and preserves stable connection for a long period of time.

In brief, a connector for small-diameter piping according to the present invention comprises a connector body formed with an axial through hole and a stepped large-diameter chamber in front-rear relation, the peripheral wall of the chamber having a plurality of lock holes distributed in the circumferential direction thereof, and the chamber having a sealing member and a bushing member fitted therein a front-rear relation; and a plurality of elastic pawl members kept in the chamber, a front end portion of each elastic pawl member resiliently retaining an expanded portion of a pipe inserted in the chamber, and a rear end portion of each elastic pawl member being passed through a corresponding one of the lock holes, bent and secured in place.

Specifically, each elastic pawl member has substantially an L-shape in cross section, or a U-shape in cross section with an upright wall formed at one end or in a central portion thereof, or a U-shape in plan view with its front end portion being circumferentially offset with respect to its rear end portion.

Therefore, since each elastic pawl member is secured in a corresponding one of the lock holes formed in the peripheral wall of the chamber, each pawl member can be readily assembled, the connector can be made compact, each front end or pawl wall can exert a strong clamping force on the expanded portion of the pipe with no fear of "permanent set in fatigue", preventing the pipe from loosening, and reliable connection can be preserved for a long period of time.

DETAILED DESCRIPTION OF THE PREFERRED EMBODIMENTS

Figure 1:
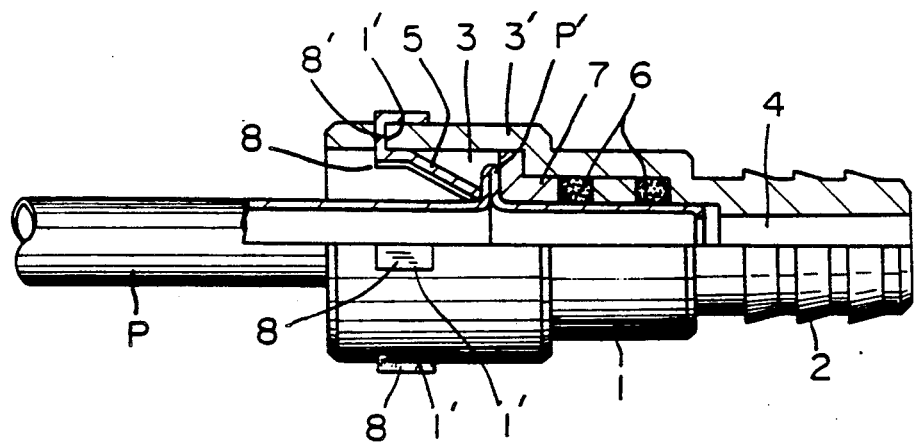
FIG. 1 is a vertical sectional view of an embodiment of a connector according to the present invention.
Figure 2:
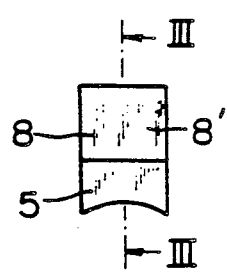
FIG. 2 is a back view of an elastic pawl member shown in FIG. 1.
Figure 3:
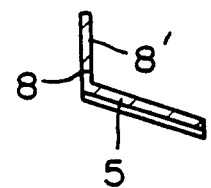
FIG. 3 is a sectional view taken along line III—III in FIG. 2.
Figure 4:
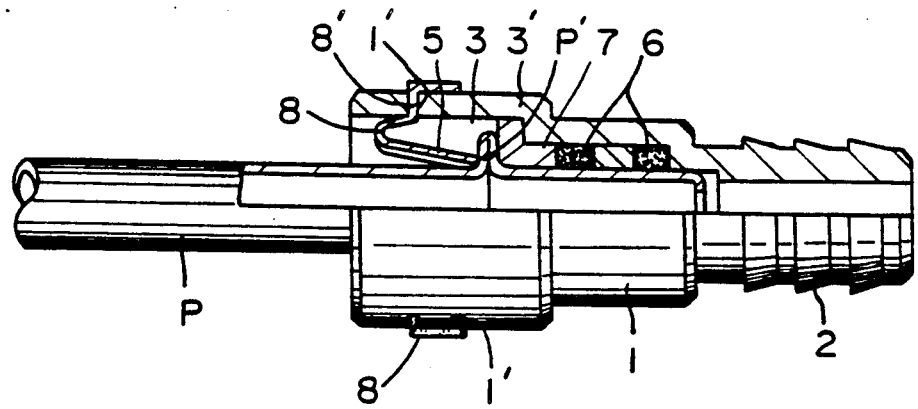
FIG. 4 is a vertical sectional view of another embodiment of the connector.
Figure 5A:
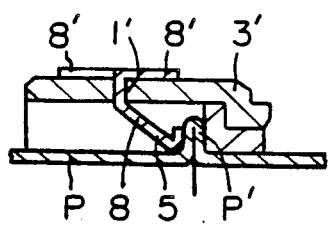
FIG. 5A is a fragmentary vertical sectional view of still another embodiment of the connector.
Figure 5B:
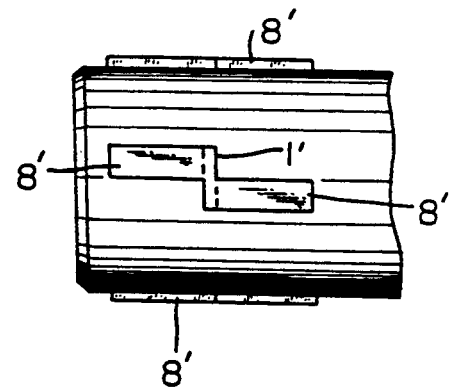
FIG. 5B is a plan view corresponding to FIG. 5A.

In FIGS. 1 through 6E, 1 is a cylindrical connector body having a coupling wall 2 provided at the front end thereof, which is formed with an axial through hole 4 and adapted to be coupled with a resin tube or rubber hose (not shown). The connector body 1 also has a stepped large-diameter chamber 3 formed therein, and the peripheral wall 3' of the chamber 3 has a plurality of lock holes 1' distributed in the circumferential direction thereof. A plurality of sealing members 6 made of an elastic material such as rubber are fitted in the chamber 3 (if desired, a spacer may be interposed between the sealing members 6), and an annular or cylindrical bushing member 7 for retaining the sealing members is attached from rear. 8 is an elastic pawl member made of a metallic spring material or resin material. A front end portion of the pawl member defines a pawl wall 5 with its rear end portion defining an upright wall 8'. Under the condition that the pawl wall 5 is kept in the chamber 3, the upright wall 8' is passed through the lock hole 1', bent and secured in place. Where a central slit is formed in the upright wall 8' and the two halves thus separated of the upright wall 8' are bent in opposite directions as shown in FIGS. 5A and B, the upright wall 8' is stably secured in place. Further, where an end portion of the pawl wall 5 is curved upward as shown in FIG. 5A, the pawl wall 5 is reliably engaged with an expanded portion P' of a pipe P. The pipe P is connected to the connector, under the condition that the expanded portion P' is inserted in the chamber 3, by resiliently pressing the end portion of the pawl wall 5 against the expanded portion P'.

Figure 6A:
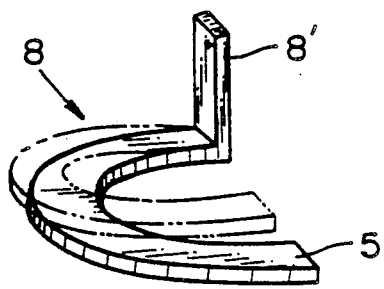
FIG. 6A is a perspective view of a further embodiment of the elastic pawl member.
Figure 6B:
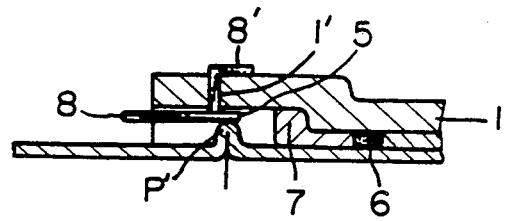
FIGS. 6B and 6C are respectively a partially enlarged sectional view and a partially enlarged sectional rear view, each showing the state where the elastic pawl member shown in FIG. 6A is positioned before engaging with an expanded portion of a pipe.
Figure 6C:
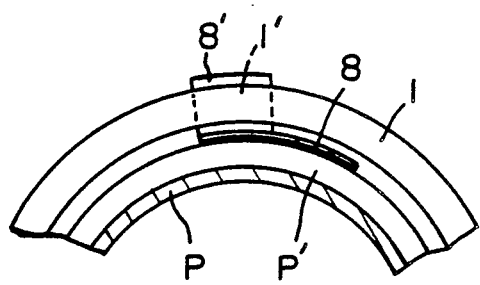
Figure 6D:
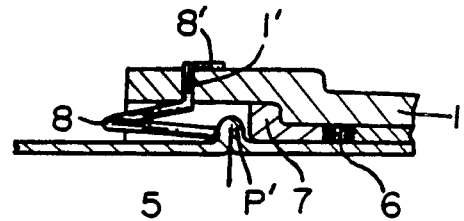
FIGS. 6D and 6E are respectively a partially enlarged sectional view and a partially enlarged sectional rear view, each showing the state where the elastic pawl member shown in FIG. 6A is positioned after engaged with an expanded portion of a pipe.
Figure 6E:
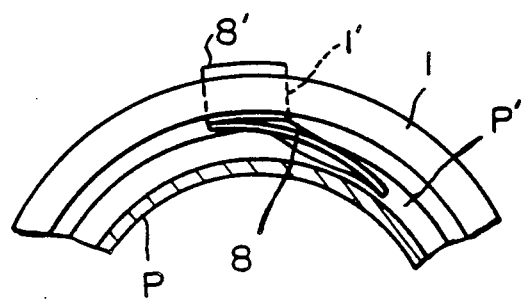
Figure 7:
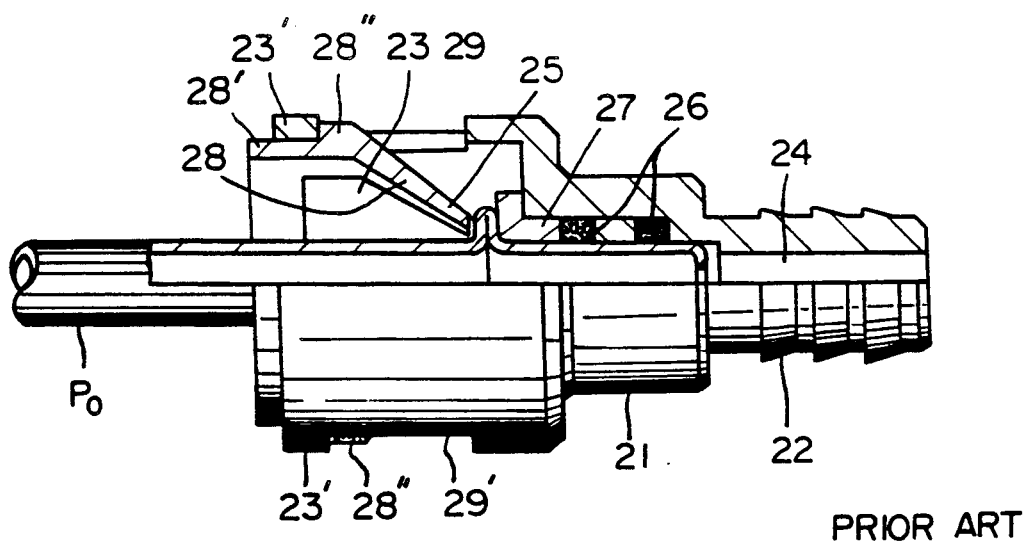
FIG. 7 is a vertical sectional view of a conventional connector.

Each elastic pawl member 8 may take substantially an L-shape (FIG. 3) or a U-shape (FIG. 4) in cross section, with the upright wall provided at one end or in a central portion of the pawl member. Further, as shown in FIGS. 6A to E, the end portion of the U-shaped pawl wall 5 may be circumferentially offset with respect to the upright wall 8'. In this case, when the pipe P is inserted in the chamber 3, the expanded portion P' of the pipe P comes to abut on the pawl wall 5 and lifts it up, so that the pawl wall 5 becomes substantially parallel to the inner surface of the chamber 3 as shown in FIG. 6B. Consequently, the gap between the inner surface of the chamber 3 and the expanded portion P' of the pipe P can be made close to the thickness of the pawl wall 5, this making it possible to decrease the diameter of the connector body 1.

As described above, the connector for small-diameter piping according to the present invention comprises the connector body 1 having the peripheral wall 3' with the chamber 3 formed therein, and each elastic pawl member 8 is secured in each lock hole 1' formed in the peripheral wall 3' of the chamber 3. Therefore, each pawl member 8 can be readily assembled, the connector can be made compact, no interference with other parts occurs even used in a narrow space, the pawl wall 5 can exert a strong clamping force on the expanded portion P' of the pipe P with no fear of "permanent set in fatigue", preventing the pipe P from loosening, and reliable connection can be preserved for a long period of time.

What is claimed is:

1. A connector for a small-diameter pipe having an end and an annularly expanded portion in selected proximity to the end of said pipe, said connector comprising:
   a connector body having opposed front and rear ends, the front end being formed with an axial through hole and the rear end being formed with a stepped large-diameter chamber communicating with said axial through hole and defined by a cylindrical peripheral wall, the peripheral wall of the chamber having a plurality of lock holes distributed in the circumferential direction thereof and extending entirely therethrough from the chamber to an external surface of the peripheral wall, and the chamber having a sealing member and a bushing member fitted therein in front-rear relation; and
   a plurality of elastic pawl members mounted to the peripheral wall of the chamber, said elastic pawl members each having a rear end, an upright wall portion and a front end, a rear end portion of each elastic pawl member being external of said chamber and being bent into engagement with the external surface of the peripheral wall, said upright wall portions and said lock holes being so constructed and arranged that an upright wall portion of each said elastic pawl member passed through a corresponding one of said lock holes is stably secured in a corresponding one of the lock holes, and a front end of each elastic pawl member projecting into the chamber for resiliently retaining the expanded portion of the pipe against the bushing upon insertion of the pipe into the connector.

2. A connector according to claim 1, wherein each elastic pawl member has substantially an L-shape in cross section.

3. A connector according to claim 1, wherein each elastic pawl member has substantially a U-shape in plan view, and its front end portion is circumferentially offset with respect to its rear end portion.

4. A connector according to claim 1, wherein each elastic pawl member is made of a metallic spring material.

5. A connector according to claim 1 wherein each elastic pawl member is made of resin material.

6. A connector according to claim 1 wherein each said lock hole is dimensioned to tightly engage the upright portion of the corresponding pawl member.

7. A connector according to claim 1 wherein the rear end portion of each elastic pawl member is longitudinally slit, such that a first longitudinal half of each rear end portion is bent forwardly and such that a second longitudinal half of each said rear end portion is bent rearwardly.

8. A connector according to claim 1 wherein the front end portion of each elastic pawl member is to arcuate cross-sectional configuration for closely engaging an outer circumferential region of said pipe.

9. A connector according to claim 1 wherein each said lock hole extends in a generally radial direction.

10. A connector according to claim 9 wherein a radially outer portion of the front end portion of each elastic pawl member extends from the upright portion toward the rear end of the connector body, and wherein a radially inner portion of the front end portion of each elastic pawl member extends from the radially outer portion forwardly in the chamber of the connector body.

11. A connector according to claim 10 wherein the radially outer portion and the radially inner portion of each elastic pawl member are bent relative to one another about an axis extending orthogonal to the axis of the pipe and orthogonal to the radial direction of the connector body.

12. A connector according to claim 10 wherein the radially outer portion and the radially inner portion of the front end portion of each elastic pawl member define arcs generated around a radius of the peripheral wall of the connector body.

13. A connector according to claim 1 wherein the connector body is of unitary construction.

14. A connector according to claim 1 wherein a portion of each said pawl member is engaged against an inner surface of said peripheral wall.

* * * * *